(No Model.) 2 Sheets—Sheet 1.
J. SCHWEIZER.
ELECTRIC CLOCK.
No. 256,386. Patented Apr. 11, 1882.
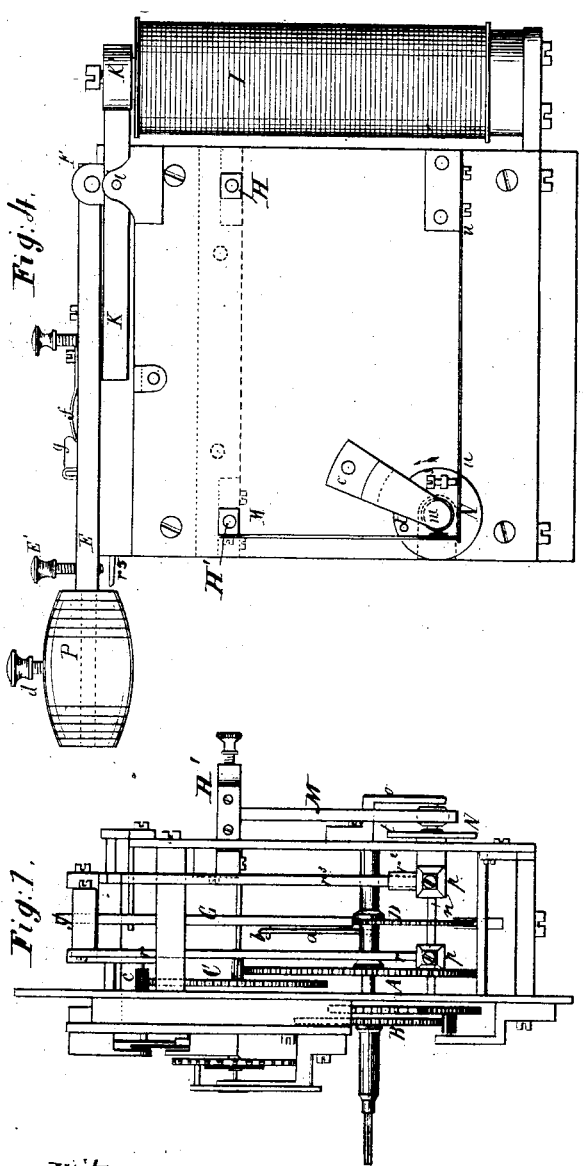
Witnesses:
Inventor.

(No Model.) 2 Sheets—Sheet 2.
J. SCHWEIZER.
ELECTRIC CLOCK.
No. 256,386. Patented Apr. 11, 1882.
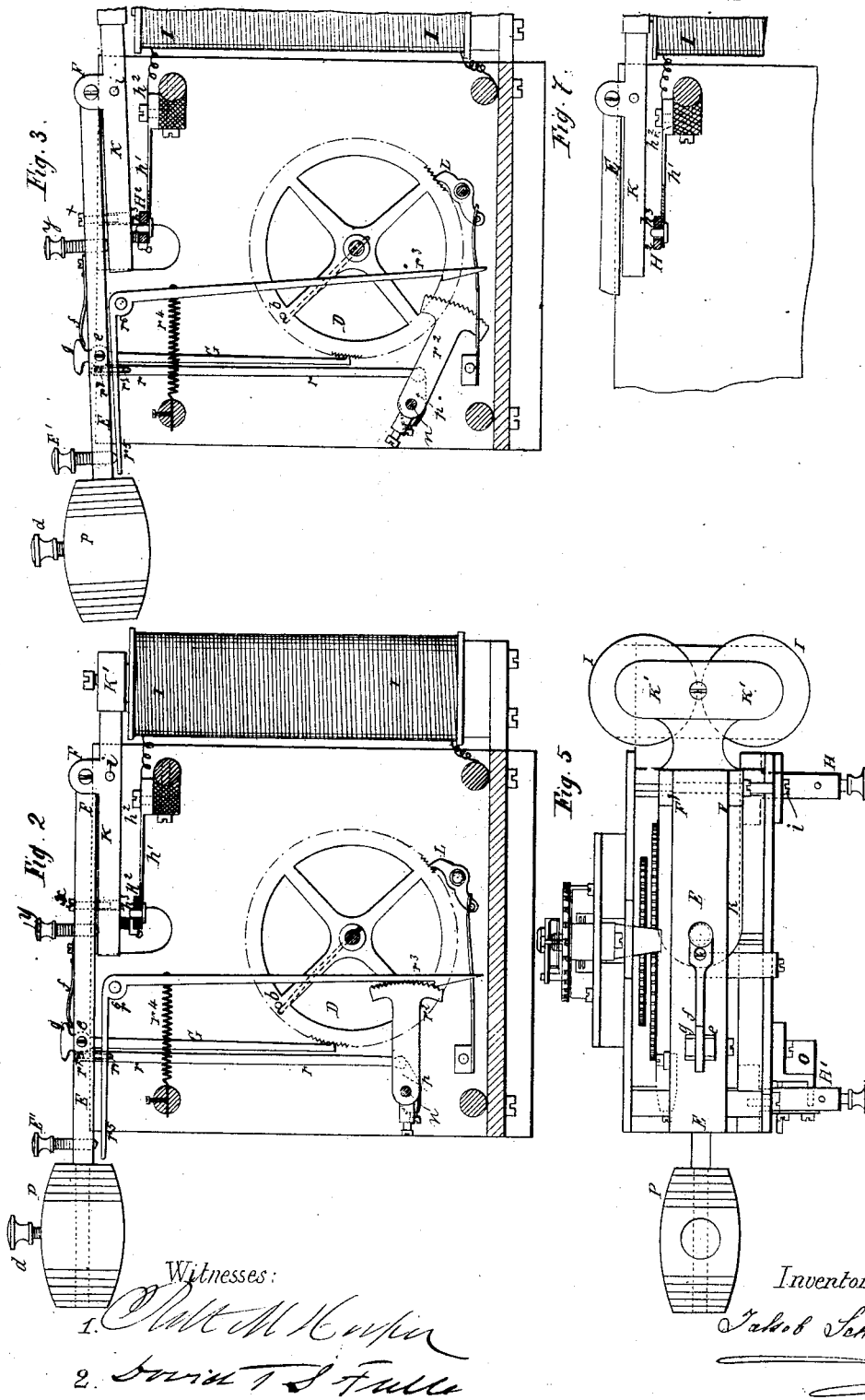

UNITED STATES PATENT OFFICE.

JAKOB SCHWEIZER, OF SOLEURE, SWITZERLAND, ASSIGNOR TO CORNELIUS ROOSEVELT, OF NEW YORK, N. Y.

ELECTRIC CLOCK.

SPECIFICATION forming part of Letters Patent No. 256,386, dated April 11, 1882.

Application filed September 2, 1881. (No model.)

*To all whom it may concern:*

Be it known that I, JAKOB SCHWEIZER, of Soleure, in the Republic of Switzerland, have invented a new and useful Improvement in Electric Clocks, which improvement is fully set forth in the following specification.

This invention has reference more particularly to clocks which are operated solely by electricity, and comprises the following new features:

First. A weight which alternately descends by gravity and is raised through an armature and lever by means of an electro-magnet operates the pawl and ratchet-disk. Said weight during its descent advances the pawl and ratchet-disk, and at or near the end of its downward movement automatically closes the circuit of an electric battery through the coils of the aforesaid electro-magnet, by which it is again raised. When it has nearly reached the highest point it breaks the circuit through the electro-magnet and releases itself from its attraction. During the rise of the weight the pawl is of course moved over the teeth of the ratchet-disk for a new operation.

Second. Means are employed to regulate the point at which, in the descent of the weight, the circuit is closed through the electro magnet.

Third. When the battery becomes exhausted so as to no longer operate the clock, means are provided whereby the circuit is left open to prevent waste of electrical energy.

The particular construction hereinafter described of the commutator or devices for making and breaking the circuit through the operating electro-magnet is also new and useful and constitutes a part of the invention.

Heretofore electric batteries have been so combined with clocks driven by a weight or spring as to wind them again when they have run down; but these instruments differ essentially in construction and operation from clocks made in accordance with this invention, and do not, so far as I am aware, embody any of the features above referred to. For example, a spring on an arbor has been combined with an electro-magnet armature-lever, pawl and ratchet, spur-wheel on the arbor, auxiliary pawl and spring, and electric contacts in such manner that the attraction of the armature drives the pawl, moves the ratchet, winds the spring, and breaks the circuit through the magnet, and that the spring then gives out its power to drive the clock until the circuit is again closed by the retraction of the armature-lever, which takes place gradually by reason of the engagement of the auxiliary pawl with the spur-wheel on the arbor.

In the present invention the operations are reversed, the weight, in its descent after the circuit is broken, operating the ratchet through the pawl and closing the circuit, the main source of power being the weight operating on the ratchet, and not a spring between the ratchet and the arbor, and the auxiliary pawl referred to being dispensed with. The other improvements referred to are also not found in the combination above indicated as heretofore known.

The accompanying drawings, which form a part of this specification, represent a clock constructed in accordance with the invention, Figure 1 being an edge view, Figs. 2 and 3 views in sectional elevation, Fig. 4 a view in rear elevation, Fig. 5 a plan, and Figs. 6 and 7 detail views, of such an instrument.

The gear-wheel A is supported on the arbor of the minute-hand, which is connected with the sleeve for carrying the hour-hand by the gears B in the usual way. The wheel C transmits to the wheel A through an intermediary pinion the movement of the pinion $c$, fixed on the arbor of the escapement-wheel, which is or may be of ordinary construction. The motive power is applied to the arbor of the minute-hand, being communicated thereto from the ratchet-disk D, supported loose on said arbor, through the pin $b$, fixed to the disk D, and the elastic bar or straight spring $a$, attached at one end to the arbor and projecting in front of the pin $b$. The bending of the bar or spring $a$ causes an elastic pressure which moves the hands of the clock and the escapement. The ratchet-disk D is revolved in the direction of the minute-hand by means of the weight P, supported at the outer end of a lever-arm, E, and communicating motion to the disk through the pawl G. The lever-arm E is connected with the bar K, which is pivoted at $i$ to the clock-frame. The arm E is pivoted to the ears or upright projections F on the bar K, and can be adjusted by means of the screws $x\ y$. The weight P is secured in position on the arm E by means of a set-screw, $d$, so that it can be moved nearer to or farther from the fulcrum $e'$ as may be desired for the purposes of adjustment. The pawl G is jointed at $e$ to the arm E. It hangs perpendicularly, and is practically tangential to the disk D, with which it is held in engagement by the spring $f$. The weight P during its descent exerts a constant pressure, and at the end of its movement it is raised by electricity. During this short period the movement of the clock is continued by the elastic force of the bar or spring $a$. A click, L, prevents backward movement of the disk. When the weight P reaches the end of its course it closes the circuit of an electric battery or other source of electricity through an electro-magnet, I, which thereupon attracts a soft-iron armature, K', at the end of the bar K and raises the lever-arm E and the weight P.

A Leclanché battery placed in the clock-case is preferably employed as the source of electricity. The poles of the battery are connected with the binding-posts H H', respectively. The post H is connected with the cross-bar $H^2$, which is attached to but insulated from the clock-frame. One end of the coils of electro-magnet I is connected at $h^2$ with the spring $h'$, which, when the clock is in operation, makes contact with the cross-bar $H^2$. A pin, $h^3$, of insulating material is fastened to the end of the spring $h'$, and serves to break the contact between the latter and the cross-bar H when the battery becomes too feeble to operate the clock, as will be hereinafter explained. The other end of the coils of electro-magnet I is in communication through the clock-frame with the disk $m$. The binding-post H is insulated from the frame, and is connected with the contact-spring M. When this spring therefore makes contact with the disk $m$ a circuit is completed through the coils of magnet I, and when the contact ceases the circuit is broken. The disk $m$ has on its periphery a small pin, on which a platinum disk fastened to the spring M rests when contact is made.

The shaft $n$, on which the disk $m$ is mounted, carries also a disk, N, insulated from the shaft by a sleeve of insulating material. On the face of the disk N is a pin, $t$, and also a projection with threaded hole, in which the screw $s$ is engaged. A flat spring, $u$, fastened at one end to an insulated support, projects under disk $m$. Contact being established between the spring M and disk $m$, as shown in Fig. 4, if motion be imparted to the shaft $n$ in the direction of the arrow it will carry with it the disks M $m$, and the pin $t$, coming in contact with the spring M, will push it away from the disk $m$, and the spring $u$, being released by the screw $s$, will rise, so that its free end is opposite that of the spring M. The position of the parts is represented in Fig. 6. The circuit through the electro-magnet is now broken, and so remains until, the shaft $n$ being revolved in the opposite direction, the parts are brought again to the position shown in Fig. 4. During this reverse movement the spring M is released by the pin $t$, but immediately comes into contact with the end of the spring $u$, which holds it away from the disk $m$ until it is itself depressed by screw $s$. The shaft $n$ is revolved in the direction of the arrow, Fig. 4, by the rise of the lever-arm E and weight P, and in the reverse direction by their descent, in the following way: On the shaft $n$ is a lever-arm, $p$, and a toothed segment, $r^2$. The arm $p$ is jointed to the rod $r$. A pin, $r^7$, fixed on lever-arm E, plays in the slot $r'$ at the upper end of rod $r$. A detent, $r^3$, formed of a bent lever, pivoted at $r^6$, is held by spring $r^4$ in engagement with the toothed segment $r^2$, except when the screw E', acting upon the horizontal arm $r^5$ of the detent, withdraws it from engagement.

In operation, as soon as the disk $m$ makes contact with the spring M a current from the battery passes through the coils of electro-magnet I, which immediately attracts its armature K' and raises the lever-arm E. The pawl G is thus lifted for renewed action upon the ratchet-disk D. The rod $r$ is lifted by contact of the pin $r^7$ with top of slot $r'$, turning the shaft $n$ and breaking the contact of disk $m$ and spring M, so that the attraction of the magnet upon the armature ceases. The detent $r^3$, having been released by the screw E', is brought into engagement with the toothed segment $r^2$. The attraction of the magnet I having ceased, the weight P immediately descends and rotates the disk D through the pawl G, causing the works of the clock to move. The parts connected with the shaft $n$ retain their position until the screw E' strikes the arm $r^5$ and releases the detent $r^3$, when the shaft $n$ at once revolves to the right, Figs. 2 to 5, the contact between the spring M and disk $m$ is re-established, and the circuit being again completed through the coils of electro-magnet I, it attracts its armature and raises the lever-arm E and weight P into position for operating, as before. The rise of the weight and lever-arm occupies only a moment, and during this time the elastic bar or spring $a$ continues to operate the clock-movement. Inasmuch as the lifting of the weight P takes place whenever the detent $r^3$ is released, its movement of vibration may be made longer or shorter by adjusting the screws E' and $x\ y$, so that the arm $r^5$ will be struck sooner or later. With a weak battery the adjustment should be made for a short movement, so that the armature K' always remains close to the poles of the electro-magnet I. With a stronger battery the movement may be longer, and the lifting of the weight P will of course take place at longer intervals. It may happen, moreover, that the battery will become so exhausted as to furnish not enough power to raise the weight P. It is obvious that in such case the contact between the spring M and disk $m$ would continue, and there would be a waste of electricity unless some expedient be employed to break the circuit. The spring $h'$ furnishes such a device, for when the current is insufficient to cause the armature $K'$ to be attracted by the magnet I the opposite end of bar K continues to descend until it strikes the non-conducting pin $h^3$ and pushes the spring $h'$ away from contact with the cross-bar $H^2$, thus interrupting the circuit at this point. During the stoppage of the clock, therefore, there is no waste of energy.

Having now fully described my said invention and the manner of carrying the same into effect, what I claim is—

1. The combination, with the clock-train and balance-wheel and a ratchet-disk connected with the arbor of the minute-hand in said train through an elastic bar or spring, of a weight heavy enough to operate the said train, a device for conveying power, such as a lever connected with said weight, an impulse-pawl between said device and the ratchet-disk, and an electro-magnet, said parts being constructed and arranged as described, so that the said weight, serving as the motive power of the clock, descends gradually, and in its descent operates the clock-train through the said impulse-pawl and ratchet-disk, and at the end of its fall is instantaneously raised by the said electro-magnet independent of said clock-train, substantially as set forth.

2. The combination, with an electro-magnet and a weighted lever provided with an impulse-pawl, of an arbor, a ratchet-disk mounted loosely on said arbor and adapted to be advanced by said pawl, an elastic bar or spring having sufficient stiffness after a slight yielding to resist the pressure of the weight, and revolving with the ratchet disk and arbor, to convey gradually to the said arbor the power of the descending weight applied to the ratchet-disk through the pawl, and electric contacts for closing a circuit through the electro-magnet as said lever descends and for breaking the circuit when it is raised, so that said weight serves as the motive power for revolving the arbor, and the said elastic bar or spring acts simply to maintain the power during the instant required to restore the weighted lever, substantially as described.

3. In an electric clock, the combination, with the weighted lever, pawl and ratchet, electro-magnet, armature, and contacts for automatically closing the circuit through the electro-magnet as the lever descends, of means, as indicated, for regulating or varying the point in the descent of said lever at which the circuit is closed, and thus regulating or varying the play of the armature and the effective stroke of the said pawl, substantially as described.

4. The combination, with a weighted lever, an electro-magnet, its armature, and contacts for automatically closing and breaking the circuit through the electro-magnet as the weight alternately descends and is raised, of an auxiliary circuit-breaker, arranged as described, for automatically breaking the circuit when the armature is no longer drawn to the electro-magnet on closing the circuit through the latter, substantially as described.

5. The combination of a shaft, contact-spring, disk mounted on said shaft for making contact with the spring, insulated disk provided with pins or projections for breaking the contact, and an additional spring for holding said contact-spring away from the disk until it is itself withdrawn, substantially as described.

6. The combination of a commutator for making and breaking an electric circuit, means, such as an unbalanced arm, for shifting said commutator when released, a trip-pawl for retaining said arm in place, a vibratory lever operating a ratchet through an impulse-pawl, an electro-magnet in the circuit of commutator, and devices connected with said lever for alternately tripping the said trip-pawl to allow the commutator to be shifted by the aforesaid unbalanced arm, and for restoring the commutator, substantially as described.

7. An electric clock comprising a clock-train with balance-wheel, an elastic bar or spring, a ratchet-disk, a click, an impulse-pawl, a weighted lever, an electro-magnet, and a commutator, constructed, combined, and arranged substantially as described, so that said weighted lever is raised by said electro-magnet independently of the clock-train, and operates in its ascent the commutator to break the circuit of the electro-magnet, and then gradually descends by gravity, operating the clock by means of the impulse-pawl and ratchet through the elastic bar or spring, and at the end of its fall operates the commutator to restore the circuit through the electro-magnet, said elastic bar or spring being sufficiently elastic and yielding to keep the clock going while the weighted lever is lifted and of sufficient stiffness to resist the pressure of the weight and cause the weight to descend gradually as the said spring with the arbor of the clock-train is revolved, as set forth.

In testimony whereof I have signed this specification in the presence of two subscribing witnesses.

JAKOB SCHWEIZER.

Witnesses:
O. SCHLAEFLI,
N. JOS. SOLOTHURNER.